United States Patent [19]

Bolcerek

[11] Patent Number: 4,927,211

[45] Date of Patent: May 22, 1990

[54] SAFETY HARNESS

[76] Inventor: Robert J. Bolcerek, 1701 Discus Dr., Las Vegas, Nev. 89108

[21] Appl. No.: 383,997

[22] Filed: Jul. 24, 1989

[51] Int. Cl.⁵ .......................................... A47D 15/00
[52] U.S. Cl. .................................. 297/465; 297/484; 297/467
[58] Field of Search ............... 297/473, 482, 465, 468, 297/484, 488, 467, 483

[56] References Cited

U.S. PATENT DOCUMENTS 4,050,737  9/1977  Jordan .................................. 297/465
4,299,406  11/1981  Thomas .......................... 297/465 X
4,762,369  8/1988  Nicod ................................... 297/484

Primary Examiner—Laurie K. Cranmer
Attorney, Agent, or Firm—Hill, Van Santen, Steadman & Simpson

[57] ABSTRACT

A child restraint device including a chest pad, a back pad, shoulder pads and a chest strap which can be connected between the chest pad and the back pad, a crotch strap which can be connected between the chest pad and the back pad, and a loop adapted to receive a seat belt stitched to the crotch strap near the back pad.

19 Claims, 3 Drawing Sheets

4,927,211

SAFETY HARNESS

BACKGROUND OF THE INVENTION

The present invention generally relates to safety harnesses. More particularly, the invention relates to passenger restraint devices for use in motor vehicles. Yet more particularly, the invention relates to child restraint devices of the kind which can be attached to the existing seat belts of motor vehicles.

Child restraint devices for use in motor vehicles which can be attached to existing seat belts are known, for example, in U.S. Pat. No. 3,954,280. These prior art devices, however, do not provide the ease of use, freedom of movement for the child wearer, and other features which are believed to be necessary in order that such devices may achieve wide market acceptance.

Other patents having disclosures which might be considered relevant and/or material to examination of this application include U.S. Pat. Nos. 2,404,505; 3,321,247; 4,050,737; land 4,302,049. No representation is made that such patents represent the prior art. However, the disclosures are incorporated herein as is necessary.

SUMMARY OF THE INVENTION

The present invention provides an improved safety harness that addresses the concerns noted previously. To this end, the invention provides a child restraint device that can be attached to an existing seat belt of the motor vehicle without providing additional means for attaching the device to the body of the vehicle.

In accordance with other principles of the invention, such child restraint device includes a dual crotch strap arrangement whereby the effective crotch strap length can be adjusted over a wide range without changing the point of attachment of the seat belt with respect to the body of the child wearer.

Accordingly, an advantage of the invention is the provision of child restraint devices for use in motor vehicles which can be installed by fastening the device to a seat belt of the vehicle, without any modification of or addition to the vehicle.

Another advantage of the invention is the provision of child restraint devices of this type which allow the child wearer to a wide range of movement.

Yet another advantage of the invention is the provision of child restraint devices of this type by means of which a small chid can be transported in the lap of an adult.

An additional advantage of the invention is the provision of a child restraint device of this type which is light in weight and comfortable for the child wearer.

A further advantage of the invention is the provision of a child restraint device of this type which can be used with or without a child's booster chair.

A yet further advantage of the invention is the provision of a child restraint device of this type which is adaptable to children ranging in weight from 20 pounds to 65 pounds or in age from one to six years.

Yet another advantage of the invention is the provision of a child restraint device of this type in which the point of attachment of the associated seat belt to the device remains fixed with respect to the body of the child despite wide variations in the effective crotch strap length.

These and other advantages will become apparent from the following description of the preferred embodiments thereof, taken in conjunction with the accompanying drawings.

DESCRIPTION OF THE PREFERRED EMBODIMENT

Figure 1:
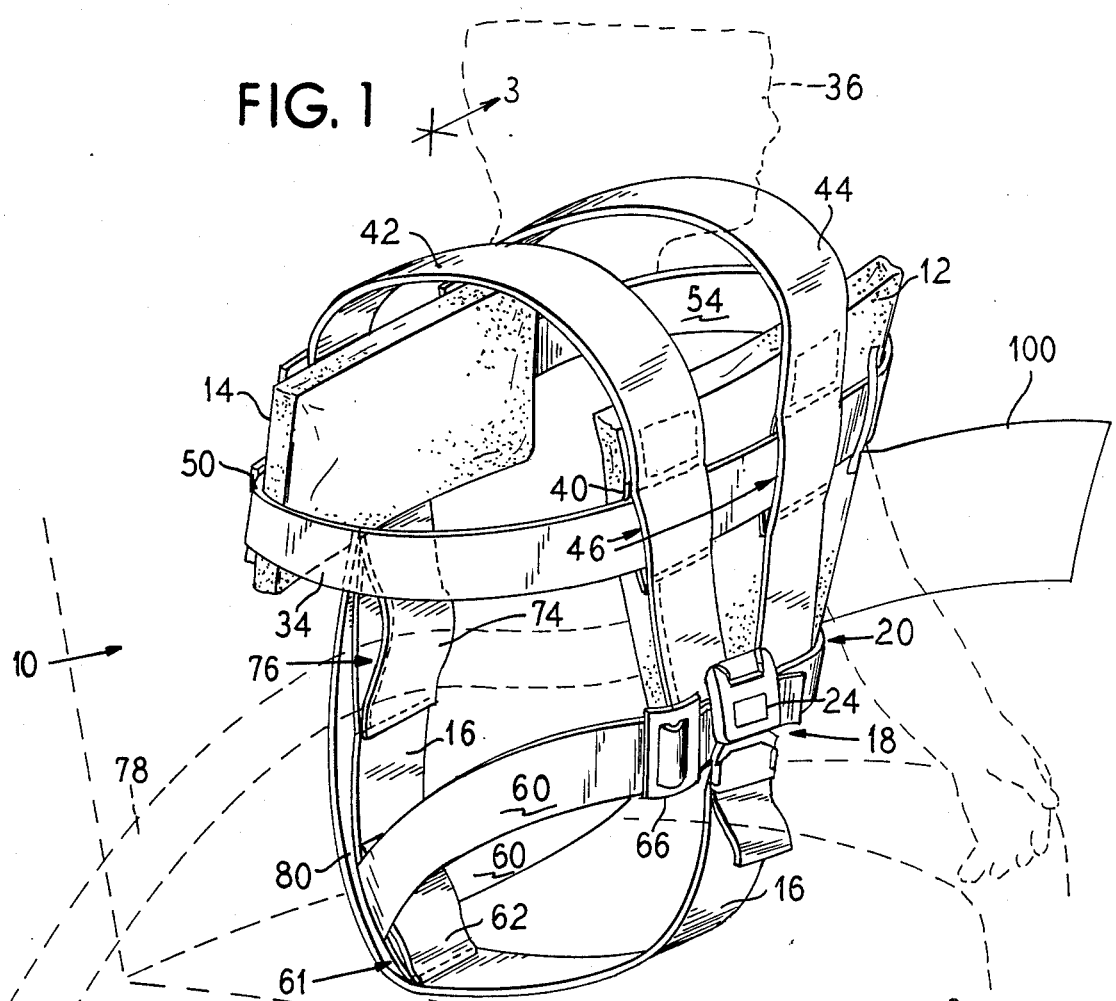
FIG. 1 is a perspective view, partially in phantom, of a child restraint device of the present invention worn by a child seated in a motor vehicle.

In FIG. 1, there is illustrated in perspective view a child restraint device 10 embodying principles the invention. As illustrated, the device 10 is adapted to be used in an automobile.

As seen in FIG. 1, child restraint device 10 comprises a substantially triangular chest pad 12, and a back pad 14. Each of these pads is formed from a resilient form material of well-known type, such as foam rubber, and is encased in a tight-fitting fabric cover, as by seam sewing.

Child restraint device 10 further comprises a crotch strap 16, one end 16" (the rearward end) of which is affixed by stitching to back pad 14. Crotch strap 16 is preferably formed from two inch wide heavy-duty nylon or polyester webbing strap material of the type from which automobile seat belts are generally fabricated.

Figure 5:
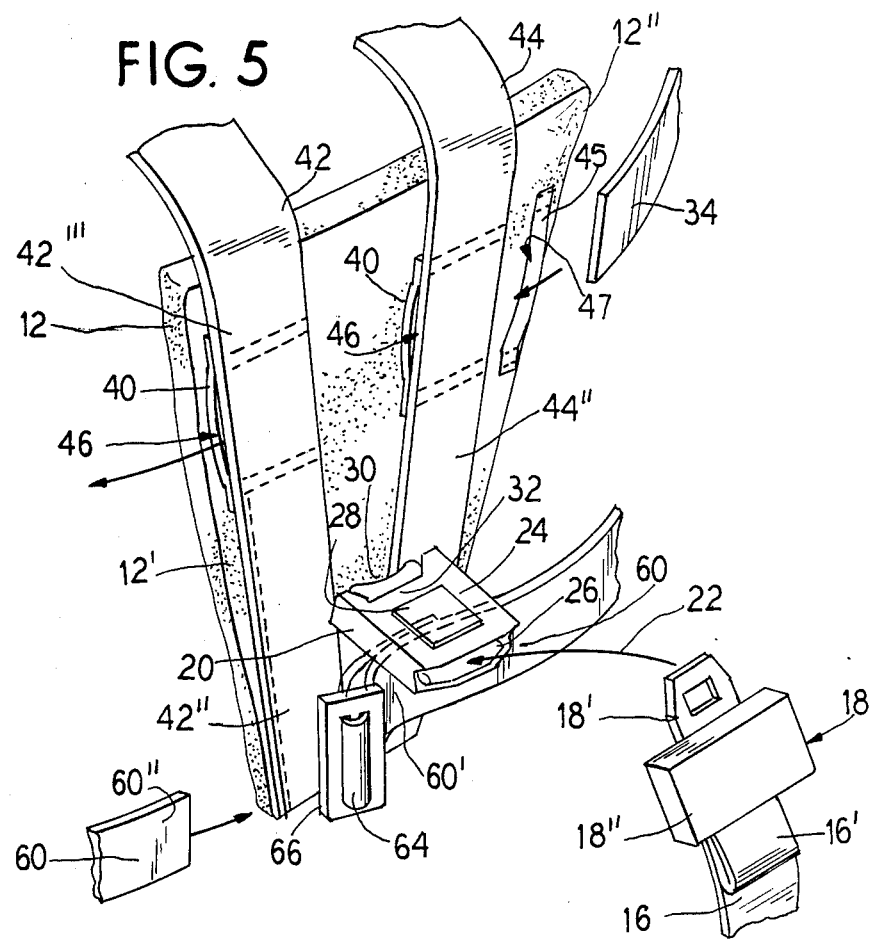
FIG. 5 is a perspective view of a part of the child restraint device of the invention as shown in FIG. 1.

Referring to FIG. 5, it will be seen that the other end 16' (the forward end) of crotch strap 16 is equipped with the tongue portion 18 of a quick release automobile seat belt buckle 20 of well-known type, which is shown in its closed and latched condition in FIG. 1. In the well-known manner, tongue portion 18 comprises a tongue 18' and an adjuster 18" to which tongue 18' is affixed. Also in the well-known manner, the forward end of crotch strap 16 passes through a friction gripping mechanism located within adjuster 18", and thus the effective length of crotch strap 16 can be adjusted at will.

As will be understood from arrow 22 in FIG. 5 by those having ordinary skill in the art, tongue 18' is adapted to cooperate with the latch portion 24 of belt buckle 20, in that when tongue 18' is fully inserted into the tongue opening 26 of latch portion 24 it will be locked therein by an internal locking mechanism until push button 28 is depressed and tongue 18' is withdrawn from tongue opening 26, all in the well-known manner.

As also seen in FIG. 5, latch portion 24 of buckle 20 is pivotally affixed to chest pad 12 by means of a fabric loop 30 which passes through the eye portion 32 of latch portion 24. Fabric loop 30 is, in the preferred embodiment, sewn to an intermediate fabric member which is itself stitched to chest pad 12.

The forward end portion 16' of crotch strap 16 is overturned and stitched in the well-known manner to prevent raveling and to prevent crotch strap 16 from being withdrawn from adjuster 18".

Returning to FIG. 1, it will be seen that child restraint device 10 further comprises a chest strap 34 which extends between chest pad 12 and back pad 14 and generally encircles the child wearer 36 across its chest and under its arms.

As may be seen in FIG. 1, double fabric panels 40 cooperate with the two shoulder straps 42, 44 of child restraint device 10 (described in detail hereinafter) to form guides or passages 46 through which chest strap 34 can be slidably passed, panels 40 being stitched to shoulder straps 42 and 44.

As illustrated, strap 42 is sewn along a lateral edge 42''' to lateral edge 12' of the chest pad 12. Accordingly, one side of strap 42 is secured to pad 12.

In contrast, strap 44 is not attached to pad 12. Instead, a small thin strap 45 is attached at its ends to lateral edge 12" of pad 12. The strap 45 and pad 12 thus form a loop 47 through which strap 34 passes. Due to this loop 47, the strap 44 is adjustable in location to accommodate children of different sizes while still being held to the pad 12.

Figure 2:
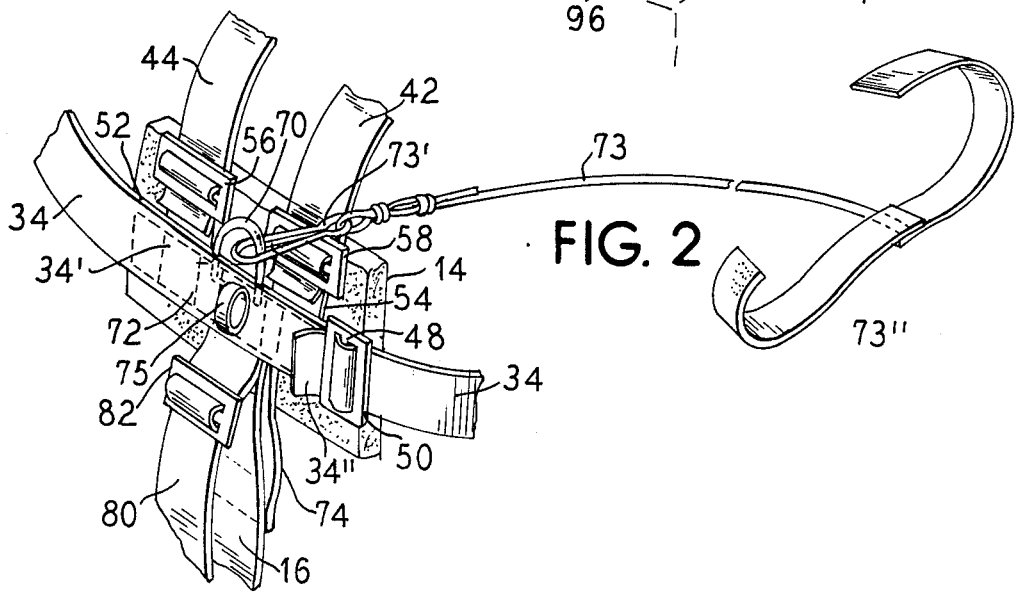
FIG. 2 is a perspective view of a part of the child restraint device shown in FIG. 1.
Figure 4:
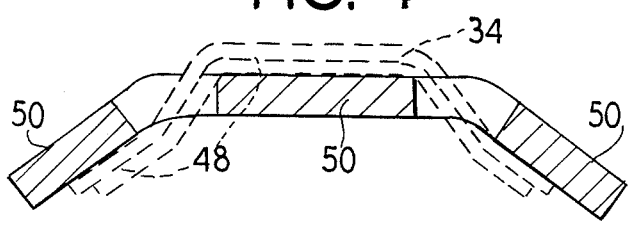
FIG. 4 is a sectional view of a friction buckle attachment which constitutes part of the invention.

As may best be seen by comparison of FIGS. 1 and 2, chest strap 34 begins and terminates at back pad 14. One end 34' (the inner end) of chest strap 34 is stitched to back pad 14 after being turned back upon itself to form a loop 48, which passes through a friction buckle 50 the configuration of which is a feature of my invention in another application and is shown in FIG. 4.

As best seen in FIG. 2, the other end 34" (the outer end) of chest strap 34 is passed through buckle 50 to secure outer end 34" to back pad 14 after chest strap 34 is passed through passages 46 as indicated in FIG. 5.

Figure 6:
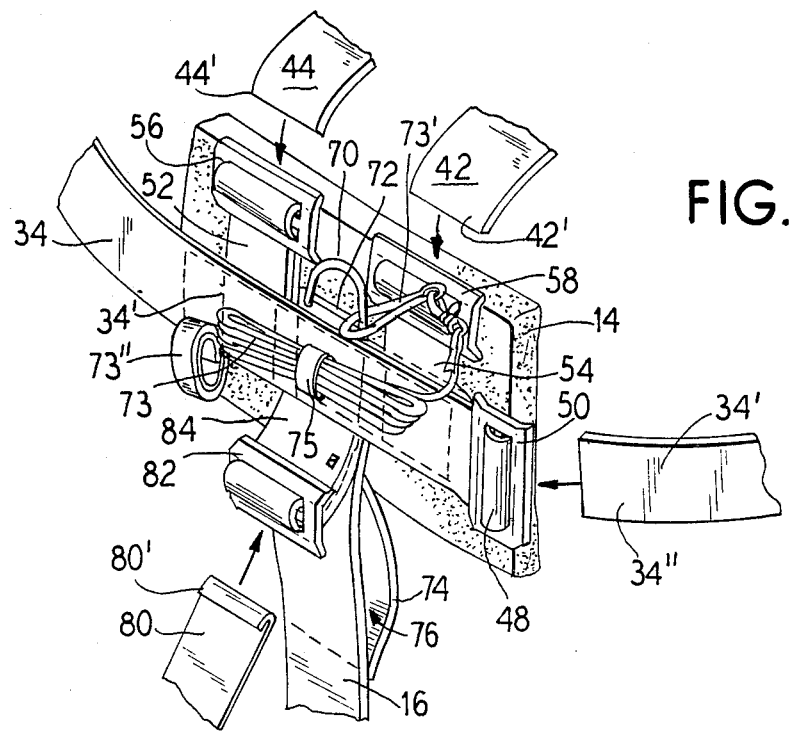
FIG. 6 is a pictorial view corresponding to the pictorial view of FIG. 2, illustrating in part the mode of securing the child restraint device of FIG. 1 to the child wearer.

The manner of joining chest strap 34 of the first preferred embodiment to back pad 14 is further illustrated in FIG. 6.

As also seen in FIG. 2, the rearward end 16" of crotch strap 16 passes under end 34' of chest strap 34 and is stitched to back pad 14 along with end 34'.

As best seen in FIG. 6, a pair of fabric strapping loops 52, 54 are formed by turning short lengths of strapping, such as one and one-half inch nylon or polyester webbing, back upon themselves, passing the respective pairs of free ends under chest strap end 34', and stitching said pairs of free ends and said end 34' to back pad 14.

As further seen in FIG. 6, a friction buckle 56 similar to friction buckle 50 is engaged with loop 52, and a similar friction buckle 58 is engaged with loop 54, providing means for securing the rearward ends 42', 44', of shoulder straps 42, 44 to back pad 14. It should be noted that in the device of the preferred embodiment the free or open, i.e., not permanently attached, ends of straps which cooperate with buckles similar to buckle 50 are stitched to prevent raveling but not turned back upon themselves before stitching, except as otherwise noted herein.

As seen in FIG. 5, the forward ends 42", 44" of shoulder straps 42, 44 are stitched to chest pad 12.

Figure 3:
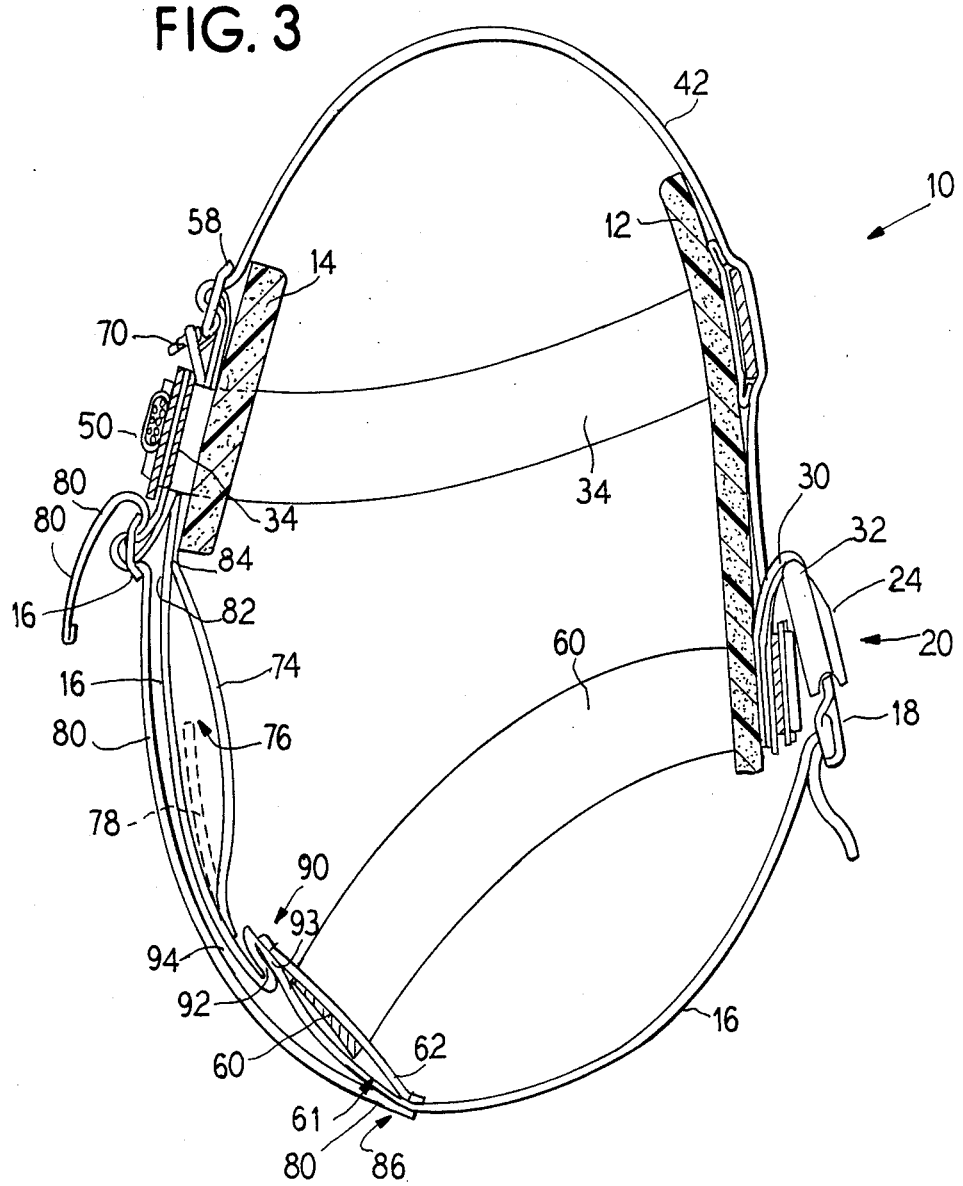
FIG. 3 is a side view, partly in section, of the child restraint device of the invention as shown in FIG. 1.

In accordance with a particular feature of the invention, child restraint device 10 further comprises a lower body strap 60, illustrated in FIGS. 1, 3, and 5.

As seen in FIGS. 1 and 3, the rearwardmost portion of lower body strap 60 passes through a loop 61 defined by a short length of strapping 62, which is itself stitched at both ends to crotch strap 16 at the position and in the manner indicated in these figures.

As best seen in FIG. 5, one of the forward ends 60' of abdominal strap 60 is formed into a loop 64 and then stitched to chest pad 12, over end 44" of shoulder strap 44.

A friction buckle 66, similar to friction buckle 50, is engaged with loop 64, and thus provides means whereby the open or free end 60" of lower body strap 60 can be secured to the lower end of chest pad 12.

In accordance with a further feature of the invention a ring 70 is attached to back pad 14. The ring 70 can comprise a D-ring which then is attached to the pad 14 by means of a loop 72 of strapping material, which is itself stitched to back pad 14. A lead 73 or the like may be attached to ring 70 when it is desired to employ child restraint device 10 as a body harness for the child when walking, etc., away from the motor vehicle in which child restraint device 10 is principally employed. For this purpose, the lead includes a hook 73' and a waistband 73".

Alternatively, the ring 70 can simply comprise a short, thin piece of strapping material directly stitched to the pad 14 or to strap 34.

Additionally, a loop of elastic material 75 is attached to a portion of the strap 34 beneath the ring 70. The lead 73 can be tucked into this loop 75 for storage, as illustrated.

Referring again to FIGS. 1 and 3, it will be seen that a short piece of strapping material 74 is sewn to the inner face of crotch strap 16 at two places to form a loop 76. The strapping material of short piece 74 is preferably the same as the material of crotch strap 16.

As shown in FIG. 1, loop 76 is constructed and arranged to coact with an automobile seat belt 78 to restrain child 36 from violent forward motion and consequent injurious contact with interior parts of the vehicle equipped with seal belt 78 during sudden stops or collisions with other vehicles.

Referring now to FIG. 3, there is shown the torque strap 80 which is a principal feature of my invention. As there seen, the lower end 80' of the torque strap 80 is affixed, by stitching, to a part 86 of crotch strap 16 located near the lower end of loop 61. The upper end 80" of torque strap 80, which is overturned and sewn to prevent raveling, is passed through a friction buckle 82 which is similar to friction buckle 50. A short piece of strapping material is turned onto itself to form a loop 84, which is stitched to back pad 14 as shown in FIG. 6. Buckle 82 is engaged with loop 84 as shown in FIG. 6.

Thus, it will be seen that torque strap 80 is permanently affixed to crotch strap 16 near the lower end of loop 61, and can be buckled to back pad 14 by means of buckle 82, which is itself affixed to back pad 14 by means of loop 84.

As best seen in FIG. 3, torque strap 80 essentially parallels the lower back portion of crotch strap 16 which extends from the lower end of loop 61 to back pad 14. As also there seen, torque strap 80 can be adjusted, by changing its point of engagement with buckle 82, to many different degrees of extension, i.e., segment lengths of torque strap 80 disposed between buckle 82 and the anchor point 86 (FIG. 3) at which the lower end of torque strap 80 is sewn to crotch strap 16.

As will now be understood by those having ordinary skill in the art, informed by the present disclosure, said lower back portion of crotch strap 16 will be of greater length than the corresponding portion of torque strap 80 in most degrees of extension of torque strap 80. It follows, then, that as shown in FIG. 3 said lower back portion of crotch strap 16 will be flaccid, and not under tension, when device 10 is worn by a child, in most degrees of extension of torque strap 80. As a result, said lower back portion of crotch strap 16 will include an overfolded portion 90, wherein a short portion 92 of torque strap 80 is folded back between an outer portion 93 and an inner portion 94 thereof.

It is to be particularly understood that the several portions 92, 93, 94 of overfolded portion 90 of torque strap 80 are *not* sewn together, but rather that overfolded portion 90 results from the relatively short length of the portion of torque strap 80 corresponding to said lower back portion of crotch strap 16, and the fact that the upper and lower ends of said lower back portion are relatively stiffened by the loops 61 and 76.

As will now be seen by those having ordinary skill in the art, informed by the present disclosure, the provision of torque strap 80 in addition to crotch strap 16 makes it possible to adjust the effective crotch strap length, i.e., the length of the strapping extending from buckle 82 to point 86 and thence to buckle 20, by means of buckle 82, without altering the engagement point of seat belt 78, i.e., the distance from back pad 14 to the lower end of loop 76, whereby to avoid altering the child restraint relationship between device 10 and its associated seat belt 78 while adjusting the effective crotch strap length for user comfort.

Referring now to FIG. 4, there is shown a particular friction buckle configuration of my invention in my other application which is preferably used for the friction buckles 50, 56, 58, 66, 82 of child restraint device 10.

As illustrated in FIG. 4, the outer portions 50', 50", of buckle 50 are bent out of the plane of the main body portion 50''', and thus these bent portions 50', 50" make better frictional contact with chest strap 34 than would be the case if buckle 50 were substantially planar.

In accordance with the principles of my invention, the fitting of child restraint device 10 to a child user is carried out as follows.

Restraint device 10 is initially fitted to the child user in such manner that chest pad 12 is immediately juxtaposed to the child's chest and back pad 14 is immediately juxtaposed to child's upper back, in which position shoulder straps 42, 44 pass over the child's shoulders, chest strap 34 passes under the child's arm by about one-half inch, crotch strap 16 passes through the child's crotch area, and abdominal strap 60 passes around the child's lower body.

The shoulder straps 42, 44, and the chest strap 34 are then pulled through their respective friction buckles until these straps snugly but comfortably engage the child's body.

Quick-release buckle 20 is then closed by pushing tongue 18' into opening 26 (FIG. 5) in the well-known manner.

Crotch strap 16 is then snugly but comfortably engaged with the child's crotch area by means of buckle 82, the frictional adjustment of buckle 20 being used only for minor adjustments when the child is secured in place on the car seat 96 (FIG. 1).

The child is then positioned on car seat 96 in the position which it is intended that the child will occupy while traveling, and seat belt 78 is passed through loop 76, and then buckled by means of its own quick-release buckle.

Car seat belt 78 is then tightened by means of the friction mechanism which is a part of its own quick-release buckle. The child should not be able to touch his own toes.

Finally, a flag 100 is sewn to the chest pad 12 along a lateral edge thereof. The flag is especially adapted for placement therein of instructions for the use of the device 10. Such instructions are required by United States Department of Transportation regulations.

It will thus be seen that the objects set forth above, among those made apparent from the preceding description, are efficiently attained, and since certain changes may be made in the above constructions without departing from the scope of my invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of the invention which, as a matter of language, might be said to fall therebetween.

I claim as my invention:

1. A restraint device, comprising:
a chest pad;
a back pad;
shoulder straps connectible between said pads;
a chest strap connectible between said pads;
a crotch strap connectible between said pads;
seat belt receiving means affixed to said crotch strap near a lower edge of said back pad; and
a torque strap affixed to said crotch strap at a point remote from said back pad, and buckle means attached to said back pad for cooperation with said strap to adjust the effective crotch strap length without alternating the position of attachment of a seat belt with respect to the body of a child wearer of the restraint device.

2. The device of claim 1, further comprising a lower body strap connectible between said chest pad and a part of said crotch strap remote from said seat belt receiving means to surround the lower body of a child wearing said child restraint device.

3. The device of claim 1, wherein the seat belt receiving means comprises a loop formed in said crotch strap.

4. The device of claim 1, further comprising releasable buckle portions attached to a lower portion of said chest pad and to said crotch strap for releasably attaching said crotch strap to said chest pad, said buckle portion attached to said crotch strap providing for adjustment of the length of the crotch strap.

5. A restraint device, comprising:
a chest pad;
a back pad;
shoulder straps connectible between said pads;
a chest strap connectible between said pads;
a crotch strap connectible between said pads;
seat belt receiving means affixed to said crotch strap near the lower edge of said back pad;
a lower body strap connectible between said chest pad and a part of said crotch strap remote from said seat belt receiving means to surround the lower body of a child wearing said child restraint device; and
a torque strap affixed to said crotch strap at a point remote from said back pad, and buckle means attached to said back pad for cooperation with said torque strap to adjust the effective crotch strap length without altering the position of attachment of said seat belt with respect to the body of the child wearer.

6. The device of claim 5, further comprising a torque strap affixed to said crotch strap at a point near said seat belt receiving means, and buckle means attached to said back pad for cooperation with said torque strap to adjust the effective crotch strap length without altering the position of attachment of said seat belt with respect to the body of the child wearer.

7. The device of claim 5, wherein said crotch strap is attached to said chest pad by means of a seat belt buckle.

8. The device of claim 5, wherein said pads are made of foam rubber.

9. The device of claim 5, wherein said straps are made of webbed material.

10. The device of claim 5, further comprising means for attaching a lead to said back pad.

11. The device of claim 10, further comprising means for storing a lead adjacent said back pad.

12. The device of claim 5, wherein said seat belt receiving means comprises a loop formed on said crotch strap through which a seat belt can be threaded.

13. A restraint device, comprising:
a chest pad;
a back pad;
shoulder straps connectible between said pads;
a chest strap connectible between said pads;
a crotch strap connectible between said pads;
seat belt receiving means affixed to said crotch strap near the lower edge of said back pad;
a lower body strap connectible between said chest pad and a part of said crotch strap remote from said seat belt receiving means to surround the lower body of a child wearing said child restraint device;
a torque strap affixed to said crotch strap at a point remote from said back pad, and buckle means attached to said back pad for cooperation with said torque strap to adjust the effective crotch strap length without altering the position of attachment of said seat belt with respect to the body of the child wearer; and
a torque strap affixed to said crotch strap at a point near said seat belt receiving means, and buckle means attached to said back pad for cooperation with said torque strap to adjust the effective crotch strap length without altering the position of attachment of said seat belt with respect to the body of the child wearer.

14. The device of claim 13, wherein the seat belt receiving means comprises a loop formed on said crotch strap through which a seat belt can be threaded.

15. The device of claim 13, wherein said chest pad comprises a substantially triangular shape.

16. The device of claim 13, wherein one shoulder strap is secured along a lateral edge of said chest.

17. The device of claim 13, wherein one shoulder strap is secured to said chest strap.

18. The device of claim 17, wherein said one shoulder strap is free to move along said chest strap but is restrained in position along a front side of said chest pad by a loop attached to said chest pad about said chest strap.

19. The device of claim 13, wherein said crotch strap is attached to said chest pad by means of a seat belt buckle, said crotch strap being adjustable in length a said buckle.

* * * * *